(12) United States Patent
Lee et al.

(10) Patent No.: US 10,379,676 B2
(45) Date of Patent: Aug. 13, 2019

(54) TOUCH DISPLAY PANEL AND DISPLAY DEVICE

(71) Applicant: BOE TECHNOLOGY GROUP CO., LTD., Beijing (CN)

(72) Inventors: Hongjoo Lee, Beijing (CN); Younjoo Kim, Beijing (CN); Bongkwan Jung, Beijing (CN); Haoran Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/514,691

(22) PCT Filed: May 27, 2016

(86) PCT No.: PCT/CN2016/083631
§ 371 (c)(1),
(2) Date: Mar. 27, 2017

(87) PCT Pub. No.: WO2016/202159
PCT Pub. Date: Dec. 22, 2016

(65) Prior Publication Data
US 2018/0348958 A1 Dec. 6, 2018

(30) Foreign Application Priority Data

Jun. 16, 2015 (CN) .......................... 2015 1 0333864

(51) Int. Cl.
*G06F 3/045* (2006.01)
*G06F 3/042* (2006.01)
(Continued)

(52) U.S. Cl.
CPC .......... *G06F 3/0421* (2013.01); *G02F 1/1368* (2013.01); *G02F 1/13338* (2013.01);
(Continued)

(58) Field of Classification Search
CPC ........ G06F 3/041; G06F 3/042; G06F 3/0421; G06F 3/0428; G06F 3/044
See application file for complete search history.

(56) References Cited

U.S. PATENT DOCUMENTS 8,049,739 B2 * 11/2011 Wu ........................ G06F 3/0486
345/175
8,350,827 B2 * 1/2013 Chung .................. G02F 1/1368
345/102
(Continued)

FOREIGN PATENT DOCUMENTS

CN 101153972 A 4/2008
CN 101963716 A 2/2011
(Continued)

OTHER PUBLICATIONS

Second Office Action for Chinese Application No. 201510333864.X, dated Jan. 15, 2018, 6 Pages.
(Continued)

*Primary Examiner* — Vijay Shankar
(74) *Attorney, Agent, or Firm* — Brooks Kushman P.C.

(57) ABSTRACT

A touch display panel and a display device are provided. The touch display panel includes a color filter substrate, an array substrate, a back light source arranged below the array substrate and a liquid crystal layer arranged between the color filter substrate and the array substrate. The color filter substrate includes a black matrix. The touch display panel further includes an optical sensor arranged between the color filter substrate and the liquid crystal layer or between the array substrate and the liquid crystal layer, and is configured to detect light emitted by the back light source, propagating through the liquid crystal layer, and then arriving at a light detection surface of the optical sensor, to acquire detection
(Continued)

data for determining a position of a touch operation performed on the touch display panel.

20 Claims, 3 Drawing Sheets

(51) Int. Cl.
    *G02F 1/1333*     (2006.01)
    *G02F 1/1368*     (2006.01)
    *G06F 3/041*     (2006.01)
    *G02F 1/1335*     (2006.01)
    *G09G 3/36*     (2006.01)

(52) U.S. Cl.
    CPC ...... *G06F 3/0412* (2013.01); *G02F 1/133512* (2013.01); *G02F 1/133514* (2013.01); *G02F 1/133553* (2013.01); *G02F 2001/133302* (2013.01); *G02F 2201/58* (2013.01); *G06F 3/0416* (2013.01); *G06F 2203/04103* (2013.01); *G09G 3/3648* (2013.01)

(56) References Cited

U.S. PATENT DOCUMENTS

| | | | | |
|---|---|---|---|---|
| 8,823,683 | B2* | 9/2014 | Chung | G06F 3/0412 178/18.09 |
| 8,933,894 | B2* | 1/2015 | Park | G06F 3/0412 345/173 |
| 9,298,315 | B2* | 3/2016 | Kim | G06F 3/042 |
| 2008/0055262 | A1 | 3/2008 | Wu et al. | |
| 2008/0074401 | A1 | 3/2008 | Chung et al. | |
| 2011/0057908 | A1 | 3/2011 | Park et al. | |
| 2011/0221707 | A1 | 9/2011 | Oyabe et al. | |
| 2011/0298757 | A1 | 12/2011 | Hata et al. | |
| 2012/0256881 | A1 | 10/2012 | Fujioka | |
| 2013/0155024 | A1 | 6/2013 | Chung et al. | |
| 2013/0257833 | A1 | 10/2013 | Kim | |

FOREIGN PATENT DOCUMENTS

| | | |
|---|---|---|
| CN | 102317891 A | 1/2012 |
| CN | 102621729 A | 8/2012 |
| CN | 103365486 A | 10/2013 |
| CN | 104880842 A | 9/2015 |
| JP | 2009015367 A | 1/2009 |
| TW | 200811803 A | 3/2008 |
| WO | 2010140770 A1 | 12/2010 |
| WO | 2011074292 A1 | 6/2011 |

OTHER PUBLICATIONS

First Office Action for Chinese Application No. 201510333864.X, dated May 19, 2017, 7 Pages.

International Search Report and Written Opinion for Application No. PCT/CN2016/083631, dated Jul. 22, 2016, 10 Pages.

* cited by examiner

TOUCH DISPLAY PANEL AND DISPLAY DEVICE

CROSS-REFERENCE TO RELATED APPLICATION APPLICATIONS

This application is the U.S. national phase of PCT Application No. PCT/CN2016/083631 filed on May 27, 2016, which claims priority to Chinese Patent Application No. 201510333864.X filed on Jun. 16, 2015, the disclosures of which are incorporated in their entirety by reference herein.

TECHNICAL FIELD

The present disclosure relates to the field of touch display technology, and in particular to a touch display panel and a display device by which an error rate of touch detection may be reduced.

BACKGROUND

In recent years, the liquid crystal display (LCD) technology has developed rapidly, the screen size has become larger and the display quality has been improved. The LCD, having small volume and low power consumption and being free of radiation, plays a leading role in the field of flat panel display. The touch screen is an important component for integrating the input and output functions, and therefore has become a necessary part of portable electronic devices.

In terms of the technical principle, the touch screen may be classified into pressure-sensing touch screen, resistive touch screen, capacitive touch screen, surface acoustic wave touch screen and touch screen based on optical detection.

The touch screen based on optical detection includes multiple optical sensors capable of detecting ambient light. When a user touches a certain touch region by a finger, a quantity of the ambient light detected by an optical sensor corresponding to the touch region may be changed due to shielding of the finger. A processor may determine a position of a touch operation based on the changed quantity of the ambient light detected by the optical sensor and output information about the position of the touch operation.

In the related technology, the optical detection of the touch screen may be inaccurate. When the ambient light is of low intensity, the optical sensor can detect a very small quantity of ambient light even when the touch screen is not touched by the finger. When the user touches the touch screen by the finger, because the intensity of the ambient light is low, the quantity of the light detected by the optical sensor may not be changed obviously relative to that before the user touches the touch screen by the finger even if all the ambient light is shielded by the finger. As a result, even if the user performs a touch operation, the device is unable to detect the touch operation. When the luminance of the ambient light is changed frequently, two successive detection results of the optical sensor may differ from each other a lot even though the user does not perform any touch operation, and then the device may determine mistakenly that the user performs a touch operation.

SUMMARY

A touch display panel and a display device are provided in the present disclosure, to reduce an error rate of touch detection.

A touch display panel is provided in the present disclosure, including a color filter substrate, an array substrate, a back light source arranged below the array substrate and a liquid crystal layer arranged between the color filter substrate and the array substrate. The color filter substrate includes a black matrix, and the touch display panel further includes an optical sensor provided with a light detection surface facing the liquid crystal layer. The optical sensor is configured to detect light emitted by the back light source, propagating through the liquid crystal layer, and then arriving at the light detection surface of the optical sensor, to acquire detection data for determining a position of a touch operation performed on the touch display panel.

Optionally, the optical sensor is arranged between the color filter substrate and the liquid crystal layer.

Optionally, the color filter substrate includes a glass substrate, the black matrix is arranged at a side of the glass substrate away from a light-outgoing surface of the color filter substrate, the optical sensor is arranged at a side of the black matrix away from the glass substrate, and an orthographic projection of the light detection surface of the optical sensor onto the glass substrate is located within an orthographic projection of the black matrix onto the glass substrate.

Optionally, a flat layer is arranged between the optical sensor and the liquid crystal layer.

Optionally, the optical sensor is arranged between the array substrate and the liquid crystal layer. The black matrix is configured to reflect light emitted by the back light source, propagating through the liquid crystal layer, and then arriving at a reflective surface of the black matrix, and to enable the reflected light to propagate through the liquid crystal layer and arrive at the light detection surface of the optical sensor.

Optionally, the optical sensor is arranged between the array substrate and the liquid crystal layer, and the touch display panel further includes a reflection layer arranged at a side of the color filter substrate close to the liquid crystal layer. The reflection layer is configured to reflect light emitted by the back light source, propagating through the liquid crystal layer, and then arriving at a reflective surface of the reflection layer, and to enable at least a part of the reflected light to propagate though the liquid crystal layer and arrive at the light detection surface of the optical sensor.

Optionally, the optical sensor and thin film transistors of the array substrate are formed simultaneously.

Optionally, the reflection layer is arranged at a side of the black matrix away from a light-outgoing surface of the color filter substrate, an orthographic projection of the light detection surface of the optical sensor onto the array substrate is located within an orthographic projection of the black matrix onto the array substrate, and an orthographic projection of the reflection layer onto the array substrate is located within the orthographic projection of the black matrix onto the array substrate.

Optionally, a flat layer is arranged between the reflection layer and the liquid crystal layer.

Optionally, a time period for displaying one frame of image by the touch display panel includes a display phase and a touch phase. The touch display panel displays a changeless image and the back light source emits light of a constant luminance, during the touch phase.

A display device is further provided, including the touch display panel hereinabove.

According to the touch display panel and the display device in the present disclosure, the optical sensor detects light that is emitted by the back light source and then propagates through the liquid crystal layer, and determines a position of a touch operation based on the detection result.

In the embodiments of the present disclosure, the light is emitted by a controllable back light source; hence, it is able to avoid the error in the touch detection in the related technology due to the uncontrollable ambient light, and an accuracy of the touch detection is improved.

DETAILED DESCRIPTION

In a touch display panel and a display device according to embodiments of the present disclosure, an optical sensor detects light that is emitted by a back light source and then propagates through a liquid crystal layer, and determines a position of a touch operation based on the detection result. In the embodiments of the present disclosure, the light is emitted by a controllable back light source; hence, it is able to avoid the error in the touch detection in the related technology due to the uncontrollable ambient light, and an accuracy of the touch detection is improved.

Figure 1:
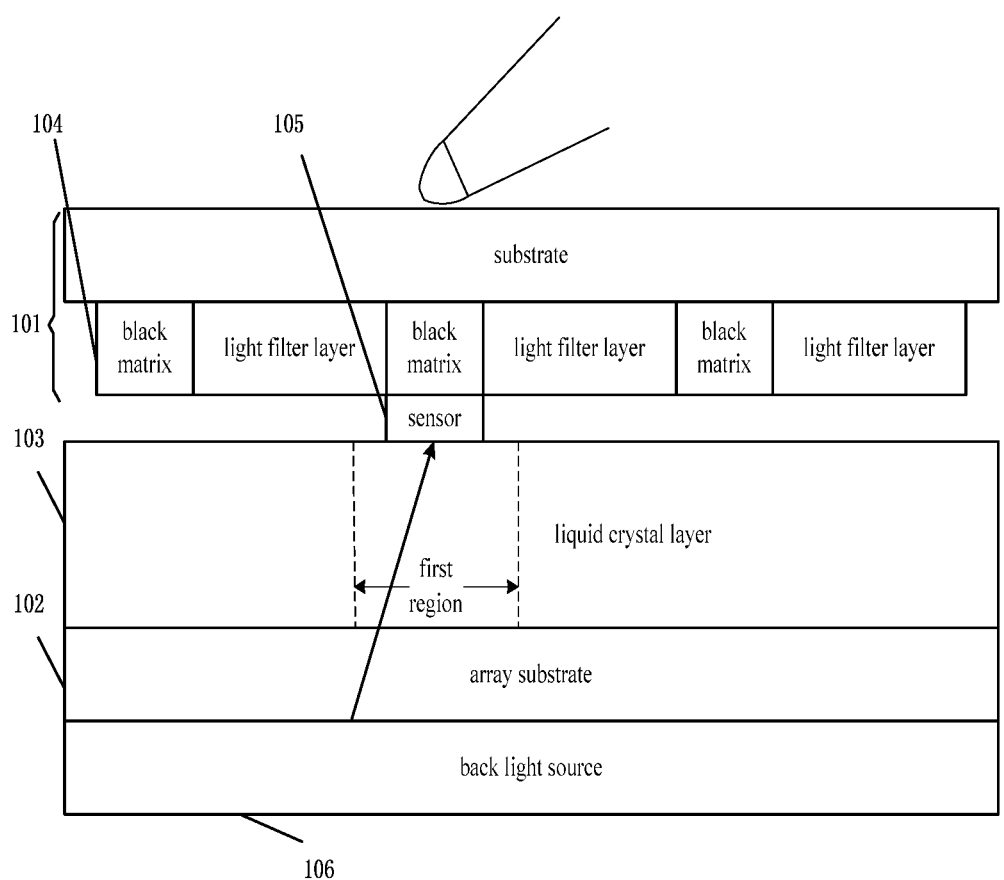
FIG. 1 is a schematic structural view of a touch display panel in some embodiments of the present disclosure.
Figure 2:
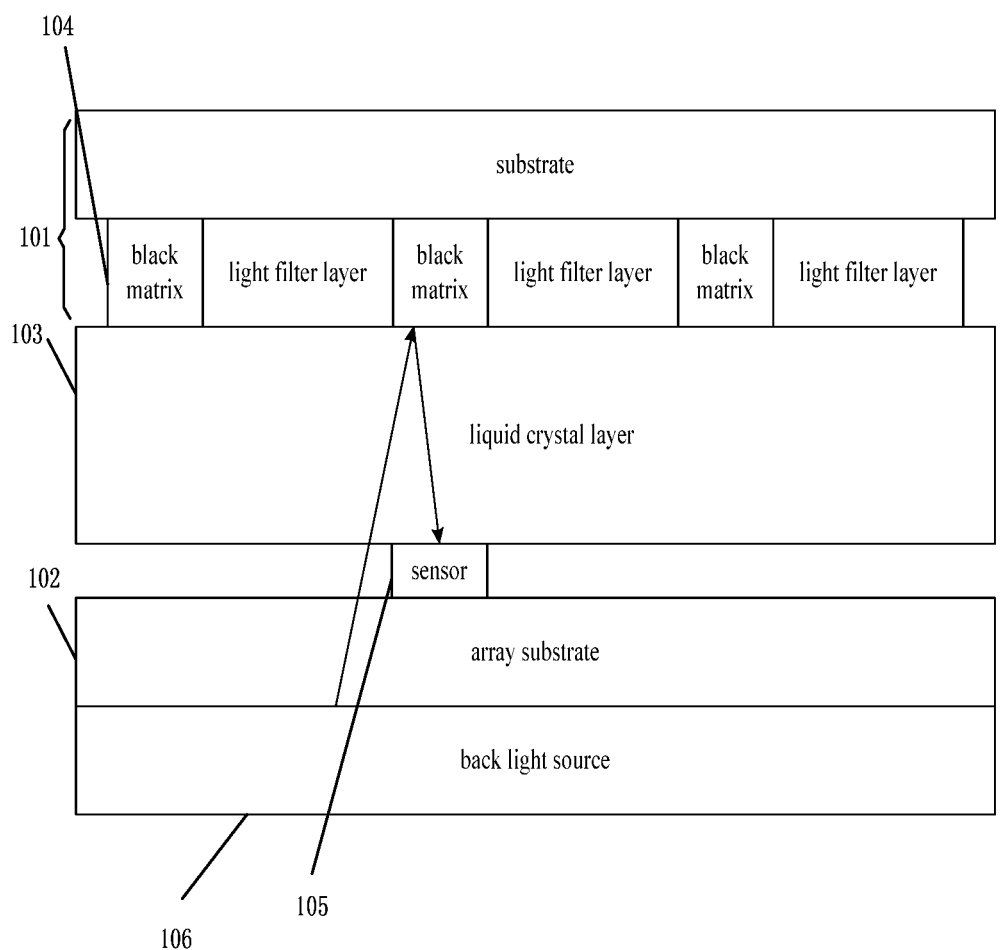
FIG. 2 is a schematic structural view of a touch display panel in some embodiments of the present disclosure.

As shown in FIGS. 1 and 2, a touch display panel is provided in some embodiments of the present disclosure, including a color filter substrate 101, an array substrate 102, a back light source 106 arranged below the array substrate 102 and a liquid crystal layer 103 arranged between the color filter substrate 101 and the array substrate 102. The color filter substrate 101 includes a black matrix 104. The touch display panel further includes an optical sensor 105 used to detect light that is emitted by the back light source 106, propagates through the liquid crystal layer 103 and then arrives at a light detection surface of the optical sensor 105, to acquire detection data for determining a position of a touch operation performed on the touch display panel.

As shown in FIGS. 1 and 2, in some embodiments of the present disclosure, when a user presses a touch region by an object, a pressure may be applied to the color filter substrate 101. As a result, a distance between a first portion of the color filter substrate 101 corresponding to the touch region and a second portion of the array substrate 102 corresponding to the touch region may be decreased.

Since the above-mentioned distance is decreased, a transmittance of a portion of the liquid crystal layer 103 between the first portion and the second portion is changed, and then the quantity of light emitted by the back light source and then detected by the optical sensor 105 arranged at a position corresponding to the first portion and the second portion is decreased.

In the case that the quantity of the detected light changes, the processor may determine the touch region based on the position of the optical sensor that detects the light having the changed quantity, thereby determining the position of the touch operation. It can be seen from the above, the touch display panel in the embodiments of the present disclosure may determine the position of the touch operation based on the light emitted by the back light source. In addition, the touch display panel which determines the position of the touch operation based on the light emitted by the back light source has the following beneficial effects:

In some embodiments of the present disclosure, the optical sensor performs the detection based on the light emitted by the back light source. In comparison with the uncontrollable ambient light, the light emitted by the back light source may be controlled during a touch detection phase, so as to meet positioning requirements.

The back light source can be controlled in the following two aspects. Firstly, a luminance of the back light source can be controlled. During the touch detection phase, the luminance of the back light source is controlled to meet a minimum detection requirement of the optical sensor, such that the optical sensor may detect a sufficient quantity of light during a certain time period to determine the position of the touch operation, and failure in touch detection in the related technology due to ambient light of low intensity can be avoided. Secondly, a stability of the back light source can be controlled. During the touch detection phase, the back light source is maintained at a relatively stable luminance. In this case, a change of the quantity of light detected by the optical sensor is caused by a change of the transmittance of liquid crystals rather than a change of the luminance of the back light source; hence, an erroneous touch detection in the related technology due to frequently changed luminance of the ambient light can be avoided.

It can be seen from the above, with the touch display panel in the embodiments of the present disclosure, erroneous touch detection and failure in touch detection in the related technology based on the uncontrollable ambient light can be avoided, thereby increasing the accuracy of the touch detection.

In comparison with the optical sensor in the related technology, the optical sensor 105 in the embodiments of the present disclose detects the light emitted by the back light source, rather than the ambient light. In addition, the light detected by the optical sensor 105 in the embodiments of the present disclose is emitted by the back light source and then propagates through the liquid crystal layer, so the detection result may reflect a thickness change of the liquid crystal layer caused by the touch operation, thereby determining the position of the touch operation.

Based on the requirements hereinabove, the optical sensor in the embodiments of the present disclosure may be arranged at different positions, and the description thereof will be made in the following.

In some embodiments of the present disclosure, the optical sensor is arranged between the color filter substrate and the liquid crystal layer.

As shown in FIG. 1, the optical sensor 105 is arranged on the color filter substrate 101, and the light emitted by the back light source 106 may propagate through the array substrate 102 and the liquid crystal layer 103, and reach the optical sensor 105 at last.

As shown in FIG. 1, when the user presses the color filter substrate with a finger, a distance between a portion of the color filter substrate in a first region and a portion of the array substrate in the first region may be changed so much that a transmittance of the liquid crystal layer 103 in the first region may be changed. The quantity of light emitted by the back light source, propagating through the liquid crystal layer in the first region, and then detected by the optical sensor 105 may be changed, and the position of the touch operation can be determined based on the position of the optical sensor that detects the light having the changed quantity.

Meanwhile, in a region other than the first region, the distance between the color filter substrate and the array substrate is not changed, so the optical sensor 105 in the region other than the first region may not detect light having a changed quantity.

In some embodiments of the present disclosure, the light detection surface of the optical sensor faces the liquid crystal layer, so the ambient light propagating through the color filter substrate may not reach the light detection surface, thereby avoiding the erroneous touch detection caused by a change of the ambient light.

In some embodiments of the present disclosure, the optical sensor may be arranged at any position of the color filter substrate within the display region. Further, in order to guarantee a relatively high aperture ratio of the display panel, the optical sensor may be arranged under the black matrix so as not to adversely affect the displaying.

Optionally, the color filter substrate includes a glass substrate, the black matrix is arranged at a side of the glass substrate away from a light-outgoing surface of the color filter substrate, the optical sensor is arranged at a side of the black matrix away from the glass substrate, and an orthographic projection of the light detection surface of the optical sensor onto the glass substrate is located within an orthographic projection of the black matrix onto the glass substrate.

By arranging the optical sensor under the black matrix, the ambient light may be shielded by the black matrix so as to protect the optical sensor from being affected by the ambient light, and the aperture ratio of the display panel may not be decreased.

As shown in FIG. 1, in the case that the optical sensor contacts the liquid crystal layer directly, the thickness of the liquid crystal layer may not be uniform and the operation of the optical sensor may be adversely affected by liquid crystals. In view of this, in some embodiments of the present disclosure, a flat layer is arranged between the optical sensor and the liquid crystal layer.

Due to the flat layer, the liquid crystals may not erode the optical sensor, thereby protecting the optical sensor effectively, and the liquid crystal layer may be effectively provided with a uniform thickness.

In some embodiments of the present disclosure, the optical sensor may be arranged between the array substrate and the liquid crystal layer.

As shown in FIG. 2, the optical sensor 105 is arranged on the array substrate 102, light emitted by the back light source 106 may propagate through the array substrate 102 and the liquid crystal layer 103 and then reach the color filter substrate 101. The light is reflected by the black matrix 104 of the color filter substrate 101 and enters the liquid crystal layer 103 again, propagates through the liquid crystal layer 103, and then reaches the optical sensor 105.

When the user presses the color filter substrate with a finger, a distance between a portion of the color filter substrate and a portion of the array substrate in a touch region may be changed so much that a transmittance of the liquid crystal layer 103 in the touch region may be changed. The quantity of light emitted by the back light source, propagating through the liquid crystal layer in the touch region, and then detected by the optical sensor 105 after the touch operation may be changed relative to that before the touch operation. The position of the touch operation can be determined based on the position of the optical sensor 105 that detects the light having the changed quantity.

Meanwhile, in a region other than the touch region, the distance between the color filter substrate and the array substrate is not changed, so the optical sensor 105 in the region other than the touch region may not detect light having a changed quantity.

The reflection characterization of the black matrix is utilized in the embodiments hereinabove. However, a reflectivity of the black matrix may be relative low and thus it is required to take measures, such as improving the luminance of the back light source at the touch detection phase; while such measure may result in the increased power consumption.

Figure 3:
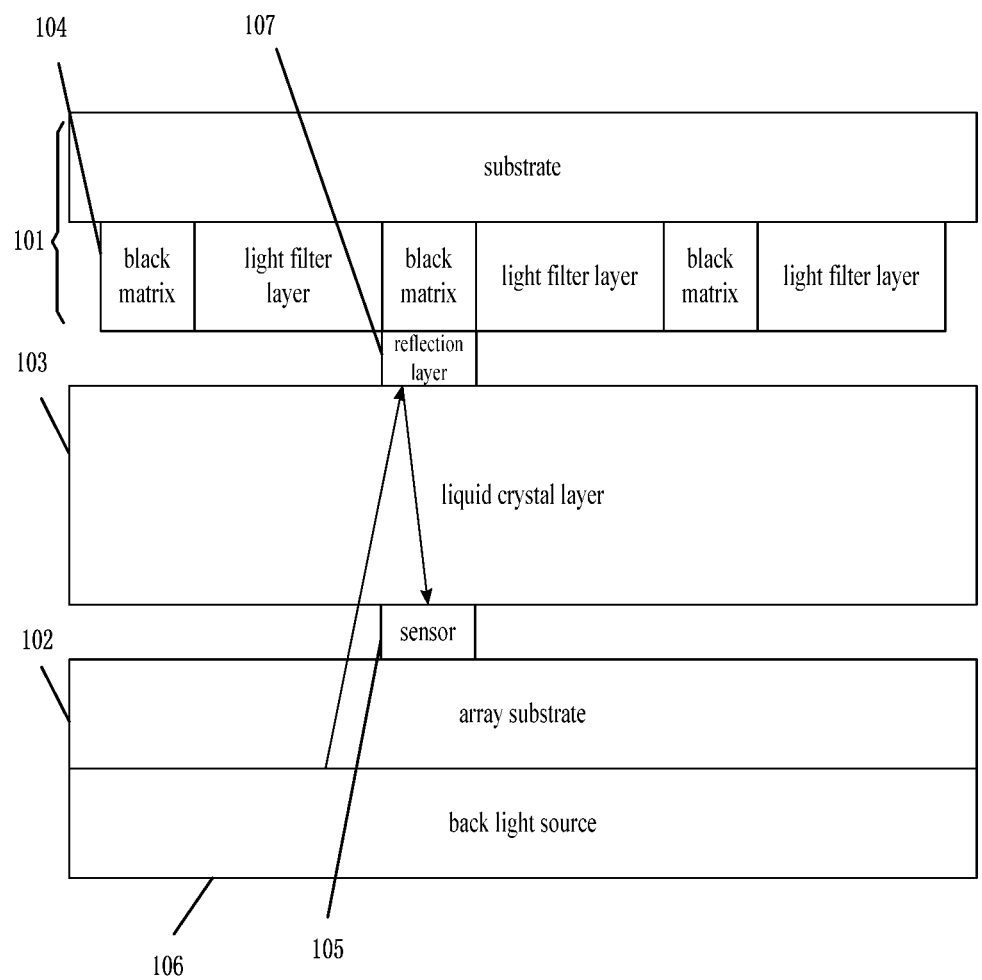
FIG. 3 is a schematic structural view of a touch display panel in some embodiments of the present disclosure.

In view of this, as shown in FIG. 3, the touch display panel in some embodiments of the present disclosure may further include a reflection layer 107, which is arranged at a side of the color filter substrate close to the liquid crystal layer and configured to reflect light emitted by the back light source 106, propagating through the liquid crystal layer 103, and then reaching a reflective surface of the reflection layer 107, such that at least a part of the reflected light can propagate through the liquid crystal layer 103 and then reach the light detection surface of the optical sensor.

As such, it is guaranteed that the optical sensor 105 may receive a sufficient quantity of light to perform the touch detection, without increasing the power consumption.

In order to reduce the adverse influence of the ambient light on the detection result of the optical sensor and improve the aperture ratio of the display panel, the reflection layer in some embodiments of the present disclosure may be arranged at a side of the black matrix away from a light-outgoing surface of the color filter substrate, an orthographic projection of the light detection surface of the optical sensor onto the array substrate is located within an orthographic projection of the black matrix onto the array substrate, and an orthographic projection of the reflection layer onto the array substrate is located within the orthographic projection of the black matrix onto the array substrate.

By arranging the optical sensor under the black matrix, the ambient light may be shielded by the black matrix so as to protect the optical sensor from being affected by the ambient light, and the aperture ratio of the display panel may not be decreased.

In some embodiments of the present disclosure, in the case that the optical sensor is arranged between the array substrate and the liquid crystal layer, the optical sensor and thin film transistors of the array substrate may be formed simultaneously, in order to simplify manufacturing process.

In the case that the reflection layer contacts directly the liquid crystal layer, the thickness of the liquid crystal layer may not be uniform. In view of this, in some embodiments of the present disclosure, a flat layer is arranged between the reflection layer and the liquid crystal layer.

Due to the flat layer, the liquid crystal layer is effectively provided with a uniform thickness and performance of the touch display panel is improved.

The touch display panel in the embodiments of the present disclosure achieves touch detection based on the change of the transmittance of the liquid crystal layer. For the touch display panel in the embodiments of the present disclosure, the transmittance of the liquid crystal layer may be changed in the following two cases. In a first case, gray levels of pixels need to be changed along with a change of a displayed image during a display process; here, the transmittance of the liquid crystal layer may be changed, to achieve the change of the gray levels.

In a second case, a thickness of the liquid crystal layer may be changed due to a touch operation, and the transmittance of the liquid crystal layer may be changed accordingly.

Since the transmittance of the liquid crystal layer may be changed in the above two cases, namely due to the change of displayed image and due to the touch operation, in some embodiments of the present disclosure, a time period (V-sync) for displaying each frame of image by the touch display panel may include a display phase (Display) and a touch phase (Touch).

The touch display panel displays a changeless image during the touch phase, so the change of transmittance of the liquid crystal layer during the touch phase may merely due to the touch operation, thereby guaranteeing the accuracy of the touch detection.

For example, the time period for displaying each frame of image by the touch screen may be 16.7 ms, where the touch phase occupies 5 ms and the display phase occupies the other 11.7 ms. Lengths of the touch phase and the display phase may be adjusted according to a processing capacity of an integrated circuit chip, which is not limited herein.

In addition, it should be appreciated that, it is required to control the back light source to emit light of a constant luminance during the touch phase.

In sum, the time period for displaying each frame of image by the touch display panel includes a display phase and a touch phase. The touch display panel displays a changeless image and the back light source emits light of a constant luminance, during the touch phase.

A display device is further provided in the present disclosure, including the touch display panel hereinabove.

The display device may be a product or component with the display function, such as cell phone, tablet PC, television, displayer, laptop computer, digital photo frame and navigator. The embodiment of the display device may refer to the embodiments of the touch display panel hereinabove, and the description thereof is omitted herein.

Obviously, a person skilled in the art may make further modifications and improvements without departing from the principle and scope of the present disclosure, and these modifications and improvements shall also fall within the scope of the present disclosure if these modifications and improvements are all within the scope of the claims and the equivalent technology thereof.

What is claimed is:

1. A touch display panel, comprising a color filter substrate, an array substrate, a back light source arranged below the array substrate and a liquid crystal layer arranged between the color filter substrate and the array substrate, wherein the color filter substrate comprises a black matrix, and the touch display panel further comprises an optical sensor provided with a light detection surface facing the liquid crystal layer;
   wherein the optical sensor is configured to detect light emitted by the back light source, propagating through the liquid crystal layer, and then arriving at the light detection surface of the optical sensor, to acquire detection data for determining a position of a touch operation performed on the touch display panel; and
   an orthographic projection of the light detection surface of the optical sensor onto the array substrate is located within an orthographic projection of the black matrix onto the array substrate.

2. The touch display panel according to claim 1, wherein the optical sensor is arranged between the color filter substrate and the liquid crystal layer.

3. The touch display panel according to claim 2, wherein the color filter substrate comprises a glass substrate, the black matrix is arranged at a side of the glass substrate away from a light-outgoing surface of the color filter substrate, the optical sensor is arranged at a side of the black matrix away from the glass substrate, and an orthographic projection of the light detection surface of the optical sensor onto the array substrate is located within an orthographic projection of the black matrix onto the array substrate.

4. The touch display panel according to claim 2, wherein a flat layer is arranged between the optical sensor and the liquid crystal layer.

5. The touch display panel according to claim 1, wherein the optical sensor is arranged between the array substrate and the liquid crystal layer, and
   the black matrix is configured to reflect light emitted by the back light source, propagating through the liquid crystal layer, and then arriving at a reflective surface of the black matrix, and to enable the reflected light to propagate through the liquid crystal layer and arrive at the light detection surface of the optical sensor.

6. The touch display panel according to claim 1, wherein the optical sensor is arranged between the array substrate and the liquid crystal layer, and the touch display panel further comprises a reflection layer arranged at a side of the color filter substrate close to the liquid crystal layer; and
   wherein the reflection layer is configured to reflect light emitted by the back light source, propagating through the liquid crystal layer, and then arriving at a reflective surface of the reflection layer, and to enable at least a part of the reflected light to propagate though the liquid crystal layer and arrive at the light detection surface of the optical sensor.

7. The touch display panel according to claim 5, wherein the optical sensor and thin film transistors of the array substrate are formed simultaneously.

8. The touch display panel according to claim 6, wherein the reflection layer is arranged at a side of the black matrix away from a light-outgoing surface of the color filter substrate, an orthographic projection of the light detection surface of the optical sensor onto the array substrate is located within an orthographic projection of the black matrix onto the array substrate, and an orthographic projection of the reflection layer onto the array substrate is located within the orthographic projection of the black matrix onto the array substrate.

9. The touch display panel according to claim 8, wherein a flat layer is arranged between the reflection layer and the liquid crystal layer.

10. The touch display panel according to claim 1, wherein a time period for displaying one frame of image by the touch display panel comprises a display phase and a touch phase; and
    the touch display panel displays a changeless image and the back light source emits light of a constant luminance, during the touch phase.

11. A display device, comprising a touch display panel, wherein the touch display panel comprises a color filter substrate, an array substrate, a back light source arranged below the array substrate and a liquid crystal layer arranged between the color filter substrate and the array substrate, the color filter substrate comprises a black matrix, and the touch display panel further comprises an optical sensor provided with a light detection surface facing the liquid crystal layer; and
    wherein the optical sensor is configured to detect light emitted by the back light source, propagating through the liquid crystal layer, and then arriving at the light detection surface of the optical sensor, to acquire detection data for determining a position of a touch operation performed on the touch display panel;

an orthographic projection of the light detection surface of the optical sensor onto the array substrate is located within an orthographic projection of the black matrix onto the array substrate.

12. The display device according to claim 11, wherein the optical sensor is arranged between the color filter substrate and the liquid crystal layer.

13. The display device according to claim 12, wherein the color filter substrate comprises a glass substrate, the black matrix is arranged at a side of the glass substrate away from a light-outgoing surface of the color filter substrate, the optical sensor is arranged at a side of the black matrix away from the glass substrate, and an orthographic projection of the light detection surface of the optical sensor onto the array substrate is located within an orthographic projection of the black matrix onto the array substrate.

14. The display device according to claim 12, wherein a flat layer is arranged between the optical sensor and the liquid crystal layer.

15. The display device according to claim 11, wherein the optical sensor is arranged between the array substrate and the liquid crystal layer, and the black matrix is configured to reflect light emitted by the back light source, propagating through the liquid crystal layer, and then arriving at a reflective surface of the black matrix, and to enable the reflected light to propagate through the liquid crystal layer and arrive at the light detection surface of the optical sensor.

16. The display device according to claim 15, wherein the optical sensor and thin film transistors of the array substrate are formed simultaneously.

17. The display device according to claim 11, wherein the optical sensor is arranged between the array substrate and the liquid crystal layer, and the touch display panel further comprises a reflection layer arranged at a side of the color filter substrate close to the liquid crystal layer; and wherein the reflection layer is configured to reflect light emitted by the back light source, propagating through the liquid crystal layer, and then arriving at a reflective surface of the reflection layer, and to enable at least a part of the reflected light to propagate though the liquid crystal layer and arrive at the light detection surface of the optical sensor.

18. The display device according to claim 17, wherein the reflection layer is arranged at a side of the black matrix away from a light-outgoing surface of the color filter substrate, an orthographic projection of the light detection surface of the optical sensor onto the array substrate is located within an orthographic projection of the black matrix onto the array substrate, and an orthographic projection of the reflection layer onto the array substrate is located within the orthographic projection of the black matrix onto the array substrate.

19. The display device according to claim 11, wherein a time period for displaying one frame of image by the touch display panel of the display device comprises a display phase and a touch phase; and the touch display panel displays a changeless image and the back light source emits light of a constant luminance, during the touch phase.

20. The touch display panel according to claim 6, wherein the optical sensor and thin film transistors of the array substrate are formed simultaneously.

* * * * *